(12) United States Patent
Huang et al.

(10) Patent No.: US 7,845,867 B2
(45) Date of Patent: Dec. 7, 2010

(54) CAMERA MODULE

(75) Inventors: Ching-Hsing Huang, Taipei Hsien (TW); Cheng-Fa Weng, Taipei Hsien (TW); Jen-Te Wang, Taipei Hsien (TW); Huai-Chao You, Shenzhen (CN); Da-Yi Wen, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 187 days.

(21) Appl. No.: 12/168,911

(22) Filed: Jul. 8, 2008

(65) Prior Publication Data

US 2009/0252489 A1    Oct. 8, 2009

(30) Foreign Application Priority Data

Apr. 3, 2008    (CN)    ........................ 2008 1 0066501

(51) Int. Cl.
*G03B 17/00*    (2006.01)
*H04N 5/225*    (2006.01)
*G02B 7/02*    (2006.01)

(52) U.S. Cl. .................. 396/529; 348/340; 359/824

(58) Field of Classification Search ................. 396/529, 396/532; 348/340; 359/819, 824
See application file for complete search history.

(56) References Cited

U.S. PATENT DOCUMENTS

| 7,596,309 | B2 | 9/2009 | Hsiao et al. | |
| 2008/0159729 | A1* | 7/2008 | Hong et al. | ................. 396/133 |

FOREIGN PATENT DOCUMENTS

| CN | 2738422 Y | 11/2005 |
| CN | 101131526 A | 2/2008 |
| WO | 2007/026830 A1 | 3/2007 |

* cited by examiner

*Primary Examiner*—Rochelle-Ann J Blackman
(74) *Attorney, Agent, or Firm*—Frank J. Niranjan (57) ABSTRACT

A camera module includes a lens unit (30) and a stator (20). The lens unit includes a lens barrel (310), a lens (312) received in the lens barrel and a permanent magnet (32) fixedly mounted around the lens barrel. The stator is for receiving the lens unit therein. The stator includes a coil seat (21b) and a coil (22b) wound therearound. The coil seat includes a base (211b) and at least a connector (24) fixed on one side of the base. The at least a connector is electrically connected with the coil and includes a connecting pin (246) extending towards a bottom surface of the base. The connecting pin is made of an electrically conductive material and adapted for electrically connecting to a printed circuit board arranged under the base.

17 Claims, 6 Drawing Sheets

CAMERA MODULE

BACKGROUND

1. Technical Field

The present invention relates camera modules, and particularly to a camera module for a portable electronic apparatus, such as a mobile telephone, a personal digital assistant or etc.

2. Description of Related Art

Camera modules are generally installed in mobile telephones, personal digital assistants or other portable electronic apparatuses to record the memorable moments due to their convenience and practicality. The designs of the camera modules have evolved toward lightweight and compactness tendency, so have the currently popular digital camera modules.

A digital camera generally includes a base, a lens, an image sensor and a motor. The image sensor is either a charge coupled device (CCD) sensor or a complementary metal oxide semiconductor (CMOS) sensor, and is controlled by a central processing unit (CPU) installed on a printed circuit broad (PCB) arranged under the base of the digital camera. The motor includes a permanent magnet mounted around the lens and coils located adjacent to the magnet. Two pins are integrally formed at a side of the base and face the PCB. Ends of the coils firstly are wound on the pins, and then electrically connected to the PCB. The PCB provides an electric current to the coils to establish an alternating magnetic field. The magnet interacts with the alternating magnetic field established by the coils to drive the lens to move telescopically until the image is fully in focus.

However, the pins formed on the base is generally made of plastic. The pins cannot electrically connect the coils to the print circuit broad directly. A flexible flat cable (FFC) is further needed to electrically connect the ends of the coils to the PCB. Due to the compact requirement for the camera module, it is not easy to connect the FFC to the coils and the PCB, which causes production and assembly of the camera to be slowly, costly and awkward.

SUMMARY

The present invention relates to a camera module. According to an exemplary embodiment of the present invention, the camera module includes a lens unit and a stator. The lens unit includes a lens barrel, a lens received in the lens barrel and a permanent magnet fixedly mounted around the lens barrel. The stator is for receiving the lens unit therein. The stator includes a coil seat and a coil wound therearound. The coil seat includes a base and at least a connector fixed on one side of the base. The at least a connector is electrically connected with the coil and includes a connecting pin extending towards a bottom surface of the base. The connecting pin is made of an electrically conductive material and adapted for electrically connecting to a printed circuit board arranged under the base.

Other advantages and novel features of the present invention will become more apparent from the following detailed description of embodiment when taken in conjunction with the accompanying drawings.

DETAILED DESCRIPTION OF THE EMBODIMENTS

Reference will now be made to the drawings to describe the various present embodiments in detail.

Figure 1:
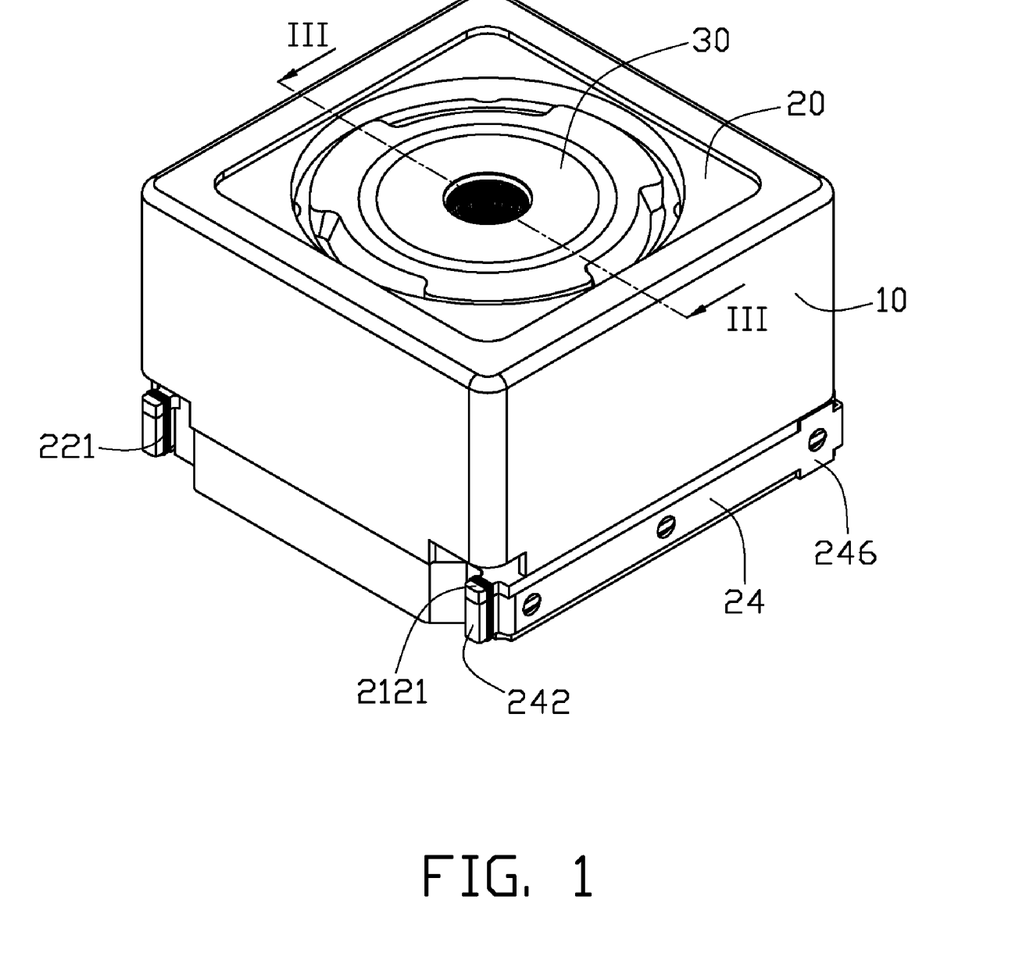
FIG. 1 is an assembled, isometric view showing a camera module in accordance with a first exemplary embodiment of the present invention.

Referring to FIG. 1, a camera module includes a lens mount 10, a lens unit 30 received in the lens mount 10, and a stator 20 received in the lens mount 10 for driving the lens unit 30 into telescopic movement. The stator 20 is disposed around the lens unit 30. A lower portion of the stator 20 extends downwardly out of the lens mount 10 and two connectors 24 are respectively attached to two opposite sides of the lower portion of the stator 20.

Figure 2:
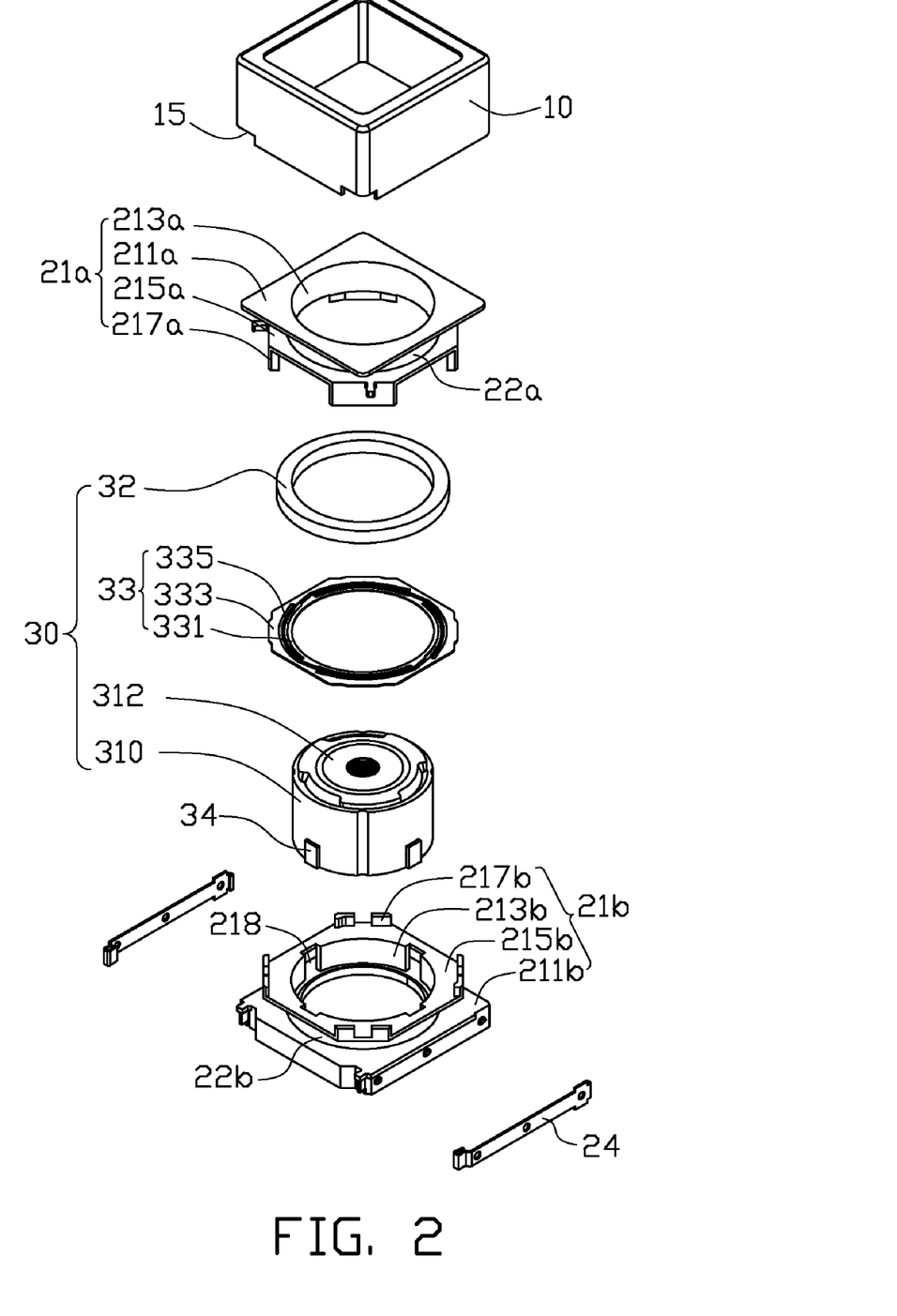
FIG. 2 is an exploded, isometric view of the camera module of FIG. 1.

Referring to FIG. 2, the lens mount 10 is hollow and has a rectangular cross-section with top and bottom ends being open. A space (not labeled) is thus defined in the lens mount 10 for receiving the motor therein. Two cutouts 15 are defined in two neighboring corners of the bottom end of the lens mount 10.

The stator 20 includes an upper coil seat 21a with an upper coil 22a wound therearound, and a lower coil seat 21b with a lower coil 22b wound therearound. The two connectors 24 are fixed on two opposite sides of the lower coil seat 22b, respectively. Both the upper coil seat 21a and the lower coil seat 21b are made of plastic.

The upper coil seat 21a includes a cylindrical sidewall 213a, a flange 215a extending radially and outwardly from a bottom end of the sidewall 213a and a top plate 211a extending radially and outwardly from a top end of the sidewall 213a. The flange 215a of the upper coil seat 21a is octagon-shaped, and four ears 217a extend perpendicularly and downwardly from four spaced corners of an outer periphery of the flange 215a towards the lower coil seat 21b.

Figure 3:
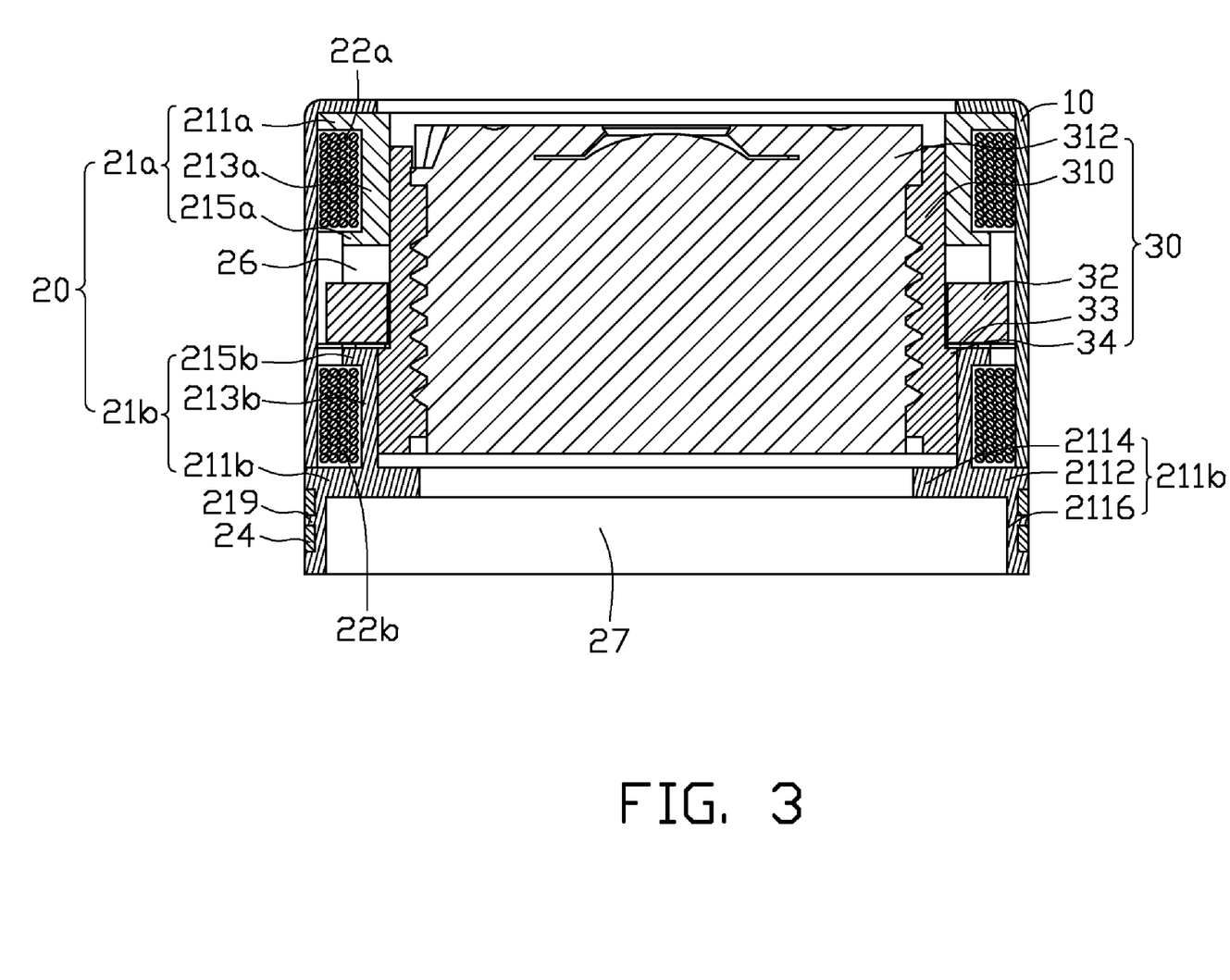
FIG. 3 is a cross-section view of the camera module of FIG. 1, taken along line III-III thereof.

The lower coil seat 21b includes a cylindrical sidewall 213b, a flange 215b extending radially and outwardly from a top end of the sidewall 213b, and a square-shaped base 211b formed on a bottom end of the sidewall 213b. The flange 215b of the lower coil seat 21b is octagon-shaped, and four pairs of ears 217b extend perpendicularly and upwardly from four spaced corners of an outer periphery of the flange 215b towards the upper coil seat 21a. Four grooves 218 are vertically and equidistantly defined in an inner surface of the sidewall 213b of the lower coil seat 21b. Each groove 218 is located between neighboring pairs of ears 217b. Referring to FIG. 3, the flanges 215a, 215b and the ears 217a, 217b cooperatively form a receiving space 26 between the flanges 215a, 215b after the upper coil seat 21a and the lower coil seat 21b are assembled together.

Figure 4:
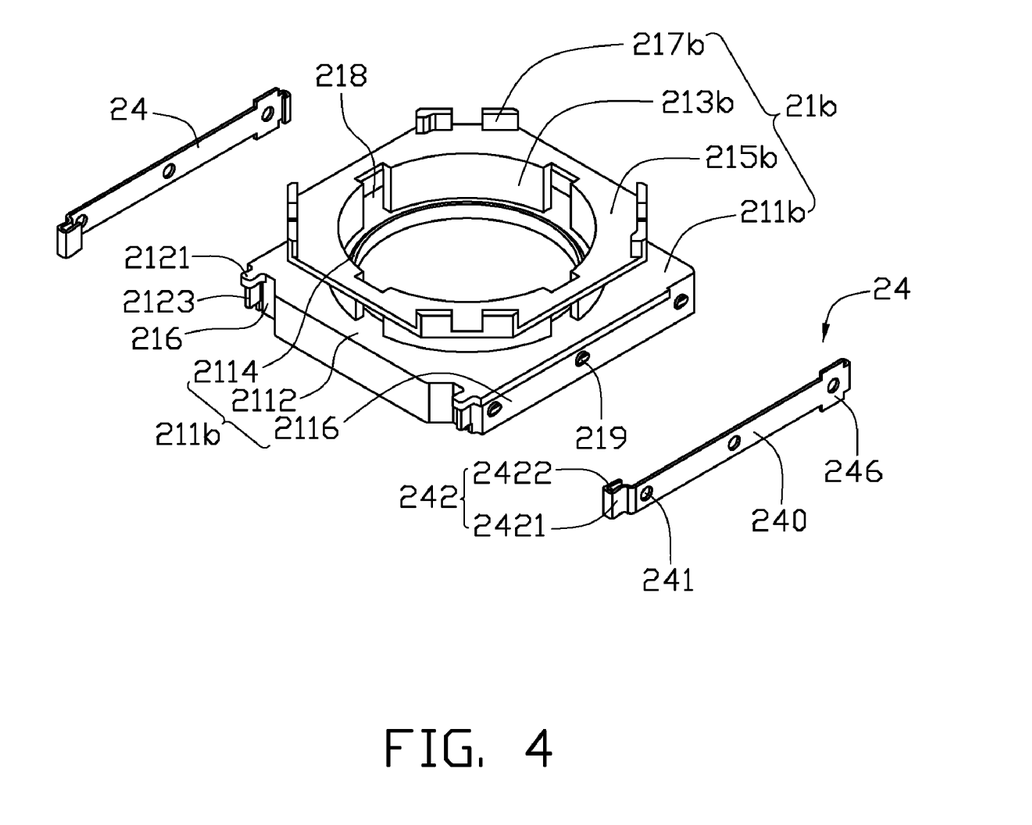
FIG. 4 is an exploded, isometric view showing the lower coil seat and the connectors of the camera module of FIG. 2.
Figure 5:
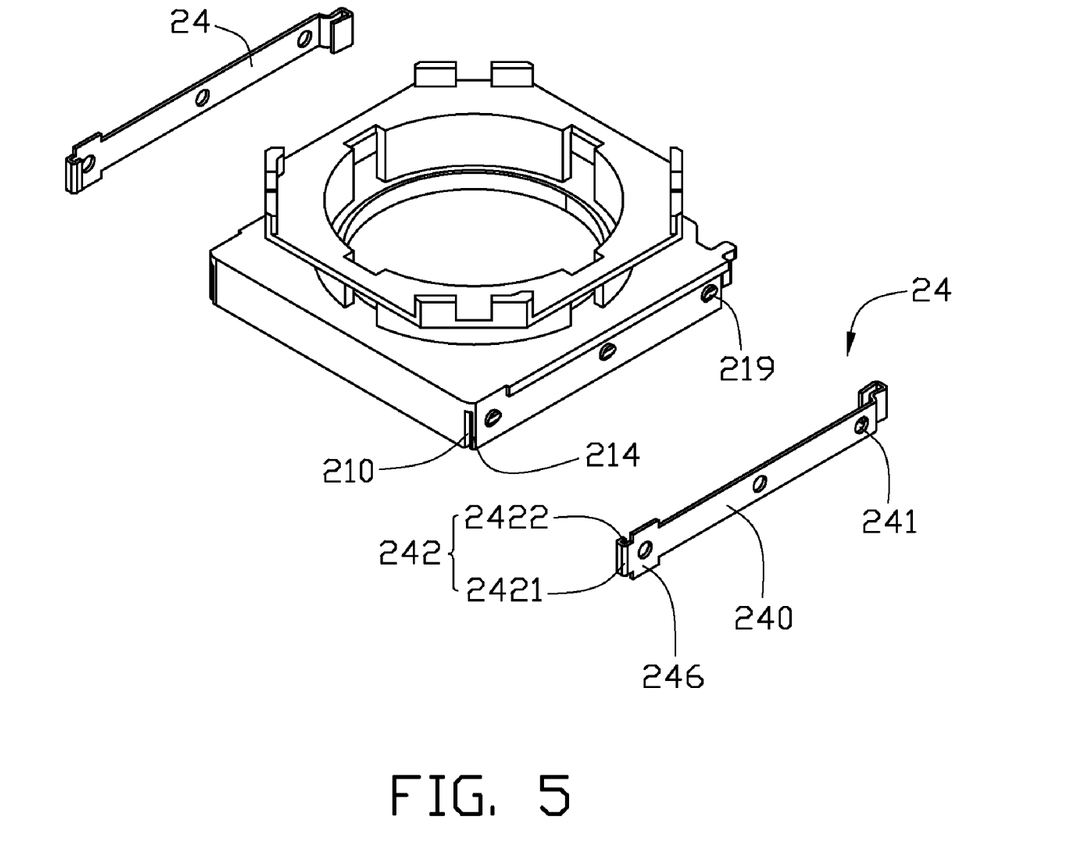
FIG. 5 is a view similar to FIG. 4, but shown from a different aspect.

Referring to FIG. 4 and FIG. 5, the base 211b includes a square-shaped bottom plate 2112 which defines a central hole (not labeled) therein, a step 2114 extending inwardly and horizontally from an inner periphery of the bottom plate 2112 and four lateral walls 2116 extending downwardly and perpendicularly from four sides of the bottom plate 2112. The bottom plate 2112 has a size substantially equal to the size of the top plate 211a of the upper coil seat 21a. A space 27 (shown in FIG. 3) is cooperatively defined by the bottom plate 2112, the step 2114 and the lateral walls 2116 for receiving an image sensor (not shown) therein. The image sensor is electrically connected with a printed circuit board (PCB) (not shown) arranged under the base 211b. The image sensor is either a charge coupled device (CCD) sensor or a complementary metal oxide semiconductor (CMOS) sensor, and is controlled by a central processing unit (CPU) installed on the PCB. Two cutouts 216 are defined in two neighboring corners of the base 211b and positioned at opposite ends of one lateral wall 2116 of the base 211b. In the present embodiment, the two cutouts 216 are defined at opposite ends of a left-side lateral wall 2116 of the base 211b, as viewed from FIG. 4. A pair of guiding pins 2121 extend outwardly from the opposite ends of the left-side lateral wall 2116 and respectively extend into the cutouts 216. The guiding pins 2121 integrally extend from a top surface of the bottom plate 2112. A pair of mounting pins 2123 integrally and outwardly extend from an outer surface of the left-side lateral wall 2116 and are located just under the guiding pins 2121. The mounting pins 2123 each have a width smaller than the guiding pin 2121. Two slots 210 are defined in another two neighboring corners of the base 211b and positioned at opposite ends of an opposite lateral wall 2116 (i.e., the right-side lateral wall 2116 as viewed from FIG. 4) of the base 211b. A pair of positioning blocks 214 are formed adjacent the slots 210 correspondingly. Three fixing poles 219 equidistantly and horizontally protrude from the remaining two lateral walls 2116 (i.e. the front-side and the rear-side lateral walls 2116 as viewed from FIG. 4), respectively. Opposite ends of each of the remaining two lateral walls 2116 are located adjacent a guiding pin 212 and a block 214, respectively.

The connector 24 is made of a material which is electrically conductive such as metal. Each of the connectors 24 includes an elongated plate-shaped main body 240, two locking units 242 and two connecting pins 246. The main body 240 has a length substantially equal to the length of the lateral wall 2116, and has a height slightly smaller than the height of the lateral wall 2116. Three holes 241 are equidistantly defined in the main body 240 and are arranged along a lengthwise direction thereof. The holes 241 are used for correspondingly receiving the fixing poles 219 of the lateral wall 2116 of the base 211b therein. The locking units 242 are formed at two opposite ends of the main body 240 respectively. Each of the locking units 242 includes a hook 2421 formed by bending a terminal end of the main body 240 and a receiving trough 2422 defined inside and enclosed by the hook 2421. One of the receiving troughs 2422 of the locking units 242 is used for receiving a corresponding mounting pin 2123 therein, and the other one of the receiving troughs 2422 of the locking units 242 is used for receiving a corresponding positioning block 214 therein. The connecting pins 246 are formed on one end of the main body 240 adjacent to the positioning block 214 and protrude from top and bottom sides of the main body 240 respectively, wherein the upper connecting pin 246 protrudes upwardly from the top side of the main body 240 such a distance that a top surface of the top connecting pin 246 is coplanar with the top surface of the bottom plate 2112, and the lower connecting pin 246 extends downwardly from the bottom side of the main body 240 to contact the PCB.

Referring back to FIG. 2 and FIG. 3, the lens unit 30 includes a magnet 32, an elastic element 33, a cylindrical lens barrel 310 and a lens 312 fixedly received in the lens barrel 310. The lens barrel 310 has four protrusions 34 outwardly extending from a lower portion thereof. The protrusions 34 are evenly spaced from each other along a circumferential surface of the lens barrel 310 for being received in the four grooves 218 of the lower coil seat 21b respectively. Each of the protrusions 34 has a constant thickness.

Both the magnet 32 and the elastic element 33 are mounted around the lens barrel 31 and are positioned over the protrusions 34. The elastic element 33 includes an inner ring 331, a concentric outer ring 333 spaced from the inner ring 331 and a plurality of elastic ribs 335 connected the inner ring 331 with the outer ring 333. The outer ring 333 has an octagon-shaped outer periphery. In assembly, the elastic element 33 is placed around the lens barrel 310, with the inner ring 331 sitting on tops of the protrusions 34. The magnet 32 is placed around the lens barrel 310 and located above the elastic element 33. The magnet 32 is fixedly adhered to an outer surface of the lens barrel 310. The inner ring 331 of the elastic element 33 is sandwiched between the protrusions 34 and a bottom surface of the magnet 32. The outer ring 333 of the elastic element 33 is affixed to a top surface of the flange 215b of the lower coil seat 21b. The lens unit 30 is moveably received in the stator 20.

Figure 6:
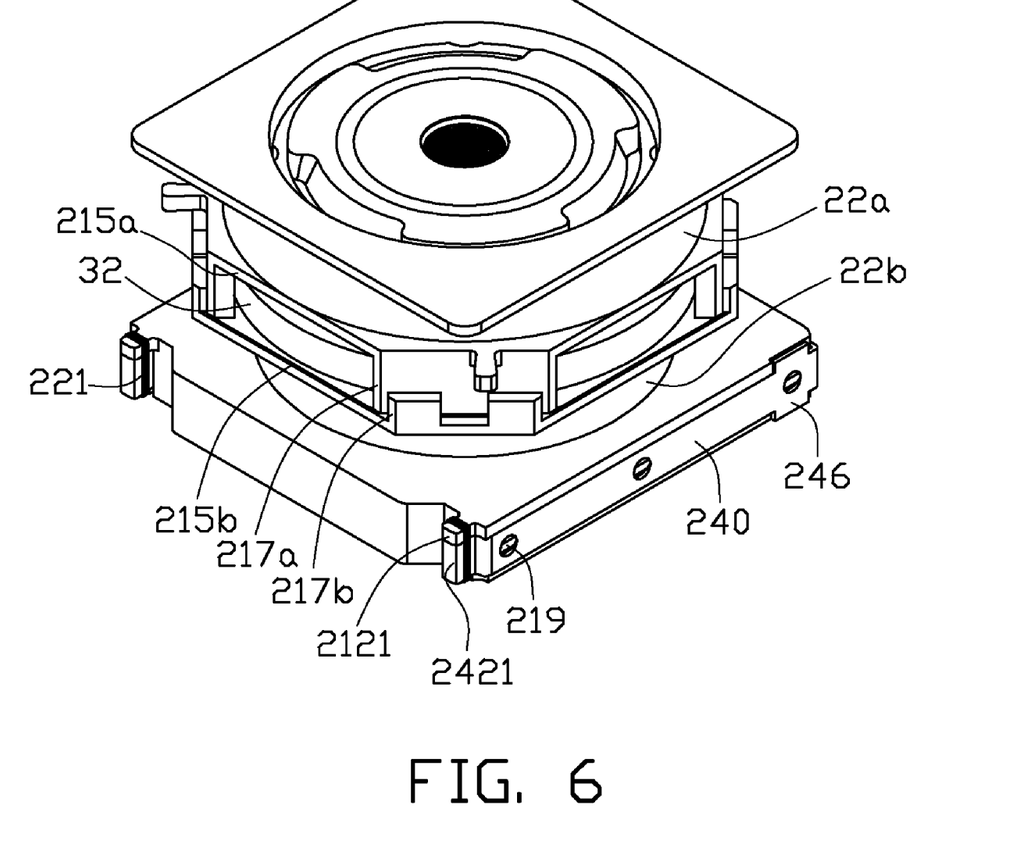
FIG. 6 is an assembled, isometric view of the camera module with an enclosure thereof being removed.

Referring to FIG. 6, the connectors 24 are connected to the two opposite lateral walls 2116 (i.e. the front-side and the rear-side lateral walls 2116) of the base 211b respectively. The fixing poles 219 of each of the lateral walls 2116 are received in the holes 241 of the corresponding connector 24. The mounting pin 2123 is engaged in one of the receiving troughs 2422 of the locking units 242, and the positioning block 214 is engaged in the other one of the receiving troughs 2422 of the locking units 242, thereby securely mounting the connectors 24 to the base 211b. The upper coil 22a and the lower coil 22b are wound around on the sidewall 213a of the upper coil seat 21a and the sidewall 213b of the lower coil seat 21b, respectively. The ends 221 of the coils 22a, 22b are wound around the corresponding guiding pins 2121 of the lower coil seat 21b and the hooks 2421 of the corresponding connectors 24, and electrically connected to the corresponding connectors 24 by soldering. As the lower connecting pins 246 projecting downwardly from the bottom sides of the connectors 24 are positioned near the PCB, the ends 221 of the coils 22a, 22b are readily electrically connected to the PCB by soldering the lower connecting pins 246 with the PCB.

During operation of the camera module, the CPU of the PCB sends a signal to control a driving current applied to the coils 22a, 22b according to an image signal from the image sensor. The coils 22a, 22b establish an alternating magnetic field after received the driving current. The magnetic field of the magnet 32 interacts with the alternating magnetic field of the coils 22a, 22b to generate an upward magnetic force which drives the lens unit 30 into telescopic movement along an axial direction of the camera module. The inner ring 331 of the elastic element 33 and one end of each of the elastic ribs 335 connected with the inner ring 331 move together with the lens unit 30. The outer ring 333 of the elastic element 33 and the other end of each of the elastic ribs 335 connected with the outer ring 333 are held in their original positions. The elastic rib 335 of the elastic element 33 is elastically deformed upwardly along the axial direction as the lens unit 30 moves upwardly. A downward elastic force is accordingly generated by the elastic element 33 due to the deformation of the elastic rib 335. When the magnetic force and the elastic force reach a balance, the lens unit 30 is stopped on a required focal position accurately. The protrusions 34 of the lens barrel 310 engage into the grooves 218 of the lower coil seat 21b to prohibit rotation of the lens unit 30. Accordingly, when different driving currents from the PCB are applied to the coils 22a, 22b via the connectors 24, the lens unit 30 is controlled to rest on different corresponding focal positions. Since the coils 22a, 22b are electrically connected with the PCB via the connectors 24, a smooth and precise movement of the lens unit 30 can be obtained.

In the present embodiment, in one aspect, the connecting pins 246 are formed on an end of the connector 24, the ends 221 of the coils 22a, 22b are electrically connected with the PCB via soldering the connecting pins 246 to the PCB, which simplifies the assembly of the present camera module. Alternatively, the connecting pins 246 can be formed on other locations of the connector 24 according to the layout of the PCB; for example, the connecting pins 246 can be formed on a middle portion of the connector 24. In another aspect, the connector 24 is made of a metal compatible with the solder. Therefore, the solder can have a firm joint with the connector 24, which prevents the solder from breaking off from the connector 24. Thus, a firm joint between the connector 24 and the PCB is attained which prevents the ends 221 of the coils 22a, 22b from having a disconnection with the PCB. Accordingly, the coils 22a, 22b can be electrically connected to the PCB easily and reliably, and the flexible flat cable (FFC), which is used to interconnect the coils 22a, 22b and the PCB in a conventional camera module is omitted in the present invention accordingly. As a result, the cost of the camera module is reduced, and assembly of the camera module is made easier and time-efficiently.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera module comprising:
   a lens unit comprising a lens barrel, a lens received in the lens barrel and a permanent magnet fixedly mounted around the lens barrel; and
   a stator receiving the lens unit therein, the stator comprising a coil seat and a coil wound therearound, the coil seat comprising a base and at least a connector fixed on one side of the base, the at least a connector electrically connecting with the coil, the at least a connector comprising a main body connected to the side of base and a connecting pin extending downwardly from a bottom surface of the main body towards a bottom surface of the base, the connecting pin being made of an electrically conductive material and adapted for electrically connecting to a printed circuit board arranged under the base;
   wherein the base comprises a pole outwardly extending from the side thereof, and the at least a connector defines a hole in the main body for receiving the pole therein, thereby securely mounting the at least a connector to the base.

2. The camera module of claim 1, wherein the at least a connector is made of metal.

3. The camera module of claim 1, wherein the at least a connector further comprises a hook formed at one end of the main body, and the base further comprises a mounting pin outwardly extending therefrom for engaging with the hook, thereby securely mounting the at least a connector to the base.

4. The camera module of claim 3, wherein the hook defines a receiving trough enclosed by the hook, the mounting pin being received in the receiving trough.

5. The camera module of claim 3, wherein the base further comprises a guiding pin outwardly extending therefrom, the guiding pin is located just above the mounting pin, and an end of the coil winds around the guiding pin and the hook and is electrically connected to the at least a connector.

6. The camera module of claim 3, wherein the at least a connector comprises another hook formed at another end of the main body, and the base comprises a positioning block for engaging with the another hook, thereby securely mounting the at least a connector to the base.

7. The camera module of claim 1, wherein the stator comprises a cylindrical sidewall upwardly extending from a top surface of the base, the coil being wound on the sidewall.

8. The camera module of claim 1, wherein the stator comprises another coil seat and another coil wound therearound, the two coil seats facing toward each other, the permanent magnet located between the two coils seats.

9. The camera module of claim 8, wherein the stator comprises another connector fixed on another side of the base, the another connector being electrically connected to the another coil.

10. The camera module of claim 1, wherein the lens unit further comprises an elastic element, the elastic element comprises a plurality of ribs, one end of each of the ribs is connected with the stator, and another end of each of the ribs is connected with the lens unit.

11. The camera module of claim 10, wherein the elastic element comprises an inner ring connected to the lens unit and a concentric outer ring connected to the stator, the inner ring and the outer ring being spaced from each other, each of the ribs interconnecting the inner ring with the outer ring.

12. The camera module of claim 1, wherein a protrusion outwardly extends from an outer surface of the lens barrel, and a groove is defined in an inner surface of the coil seat for receiving the protrusion therein.

13. A camera module comprising:
   a stator comprising a coil seat having a base and a sidewall extending from the base and defining a central hole therein, a coil wound around the sidewall, a connector secured to the base, wherein an end of the coil is soldered to an end of the connector, and wherein the connector forms a downwardly projecting contact extending towards a bottom of the base and adapted for electrically connecting with a printed circuit board;
   a lens unit telescopically received in the central hole of the sidewall of the coil seat of the stator, comprising a barrel, a lens fixed in the barrel and a magnet mounted around the barrel; and
   an elastic element having an inner ring fixed to the lens unit, an outer ring fixed to the stator and a plurality of elastic ribs interconnecting the inner ring and the outer ring.

14. A camera module comprising:
   a lens unit comprising a lens barrel, a lens received in the lens barrel and a permanent magnet fixedly mounted around the lens barrel; and
   a stator receiving the lens unit therein, the stator comprising a coil seat and a coil wound therearound, the coil seat comprising:
   a base comprising a mounting pin outwardly extending therefrom; and
   at least a connector fixed on one side of the base, the at least a connector electrically connecting with the coil, the at least a connector comprising:
   a main body connected to the side of base;
   a connecting pin extending downwardly from a bottom surface of the main body towards a bottom surface of the base, the connecting pin being made of an electrically conductive material and adapted for electrically connecting to a printed circuit board arranged under the base; and a hook formed at one end of the main body;

wherein the mounting pin engages with the hook, thereby securely mounting the at least a connector to the base.

15. The camera module of claim 14, wherein the hook defines a receiving trough enclosed by the hook, the mounting pin being received in the receiving trough.

16. The camera module of claim 14, wherein the base further comprises a guiding pin outwardly extending therefrom, the guiding pin is located just above the mounting pin, and an end of the coil winds around the guiding pin and the hook and is electrically connected to the at least a connector.

17. The camera module of claim 14, wherein the at least a connector comprises another hook formed at another end of the main body, and the base comprises a positioning block for engaging with the another hook, thereby securely mounting the at least a connector to the base.

* * * * *